March 17, 1970  R. RITZ  3,500,640
HYDRODYNAMIC TRANSMISSION, ESPECIALLY FOR RAIL VEHICLES
Filed July 29, 1968

United States Patent Office 3,500,640
Patented Mar. 17, 1970

3,500,640
HYDRODYNAMIC TRANSMISSION, ESPECIALLY FOR RAIL VEHICLES
Rolf Ritz, Heidenheim (Brenz), Germany, assignor to Voith Getriebe KG, Heidenheim (Brenz), Germany
Filed July 29, 1968, Ser. No. 748,489
Claims priority, application Germany, Aug. 5, 1967, 1,580,951
Int. Cl. F16d *33/00;* F16h *41/00*
U.S. Cl. 60—54                          4 Claims

ABSTRACT OF THE DISCLOSURE

A hydrodynamic transmission, especially for rail vehicles, with at least two preferably differently designed coaxially arranged fluid flow circuits, especially two torque converters, which comprises a gear transmission drivingly connected to said fluid flow circuits between the same, a first housing common to and encasing said fluid flow circuits and a second housing having said first housing mounted therein at two spaced areas arranged symmetrically with regard to a straight line passing through the input shaft of the transmission and through the central plane of the gear transmission, the drive shaft being mountable in said second housing so as to be connected selectively on one or the other side thereof to a prime mover.

---

Figure 1:
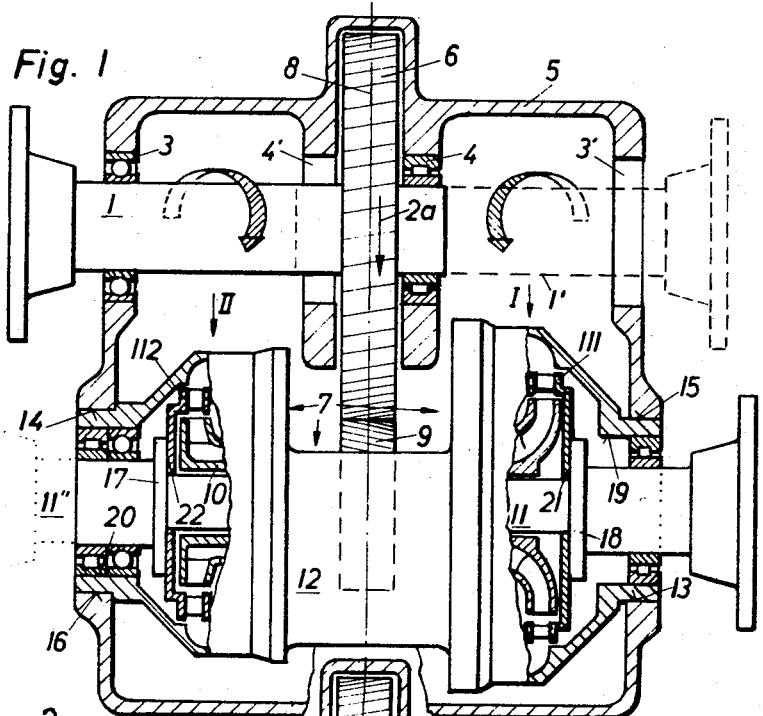

The present invention relates to a hydrodynamic transmission, especially for rail vehicles, with at least two preferably differently designed and coaxially arranged fluid flow circuits, in particular two converters, and also with an input gear stage interposed between the fluid flow circuits, and furthermore with a turbine shaft common to said fluid flow circuits and parallel to the drive shaft while a fluid flow transmission is provided, which is common to said fluid flow circuits. The present invention concerns in particular a hydrodynamic transmission as outlined above, in which the fluid flow transmission housing is built into a unit housing and is connected thereto at at least two different areas while the bearing areas for the turbine wheel shaft in the transmission housing are arranged symmetrically and also the connecting areas of the output blade wheels on the turbine shaft are likewise arranged symmetrically.

A transmission of the above mentioned type has proved satisfactory for many purposes of employment, particularly for rail vehicles, and new constructions of the type involved are laid out so as to accommodate such transmissions. Since in the course of time on the basis of experience certain power classes of vehicle drives have been developed, the manufacturer of such drives can limit his stock to relatively widely stepped series of such transmissions.

However, inasmuch as for the power ranges involved the conditions for installing such transmissions vary, the manufacturer of such transmissions has, in spite of the above mentioned standardization, still to consider a number of individual requirements of the customer. Above all, the manufacturer has to keep transmissions available in all classes which are suitable for a direction of rotation of the drive in clockwise direction and also has to have available transmissions which can be driven in the opposite direction. Furthermore, in all power classes, transmissions must be available in which the input as well as the output shaft may be arranged selectively on one or the other transmission side; this means eight different designs of a transmission in each power class. For these designs the transmission manufacturer must in addition to those elements which are the same for all classes, also stock a number of nearly similar individual elements. Since such stock keeping concerns in particular large housing parts and shafts, the desired variation in design is time consuming and expensive.

It is, therefore, an object of the present invention to provide a transmission which will overcome the above mentioned drawbacks.

It is another object of this invention to provide a transmission of the above mentioned general type which will make it possible to assemble the individual parts of the transmission in different ways so that at least some of the eight different above mentioned constructions or types of a transmission class may be built up of the same parts and the manufacture of additional parts will not be necessary.

Figure 2:
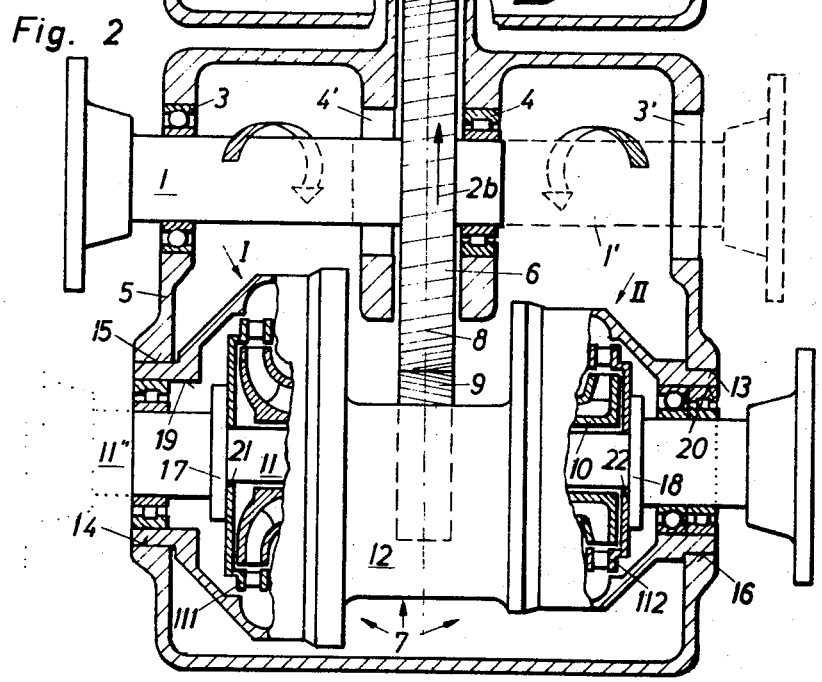

These and other objects and advantages of the invention will appear more clearly from the following specification in connection with the accompanying drawing, in which:

FIGURES 1 and 2 illustrate a hydrodynamic transmission with a fluid flow transmission with two differently designed and coaxially arranged converters; FIG. 1 illustrating the transmission built-up for a clockwise direction of rotation when looking in the direction of the power flow of the full line output shaft, and FIG. 2 illustrating the transmission for the opposite direction of rotation.

The hydrodynamic transmission according to the present invention is characterized primarily in that the symmetry with regard to a straight line extending through the axis of the fluid flow transmission and located in the central plane of the driving gear is of a linearly symmetrical character, and is furthermore characterized in that additionally the connecting areas on the fluid flow transmission housing and on the unit transmission housing are in the same way designed linearly symmetrically.

In view of this design, the transmission while employing the same parts, can on one hand be assembled in two different ways or to different structures of which one is suitable for rotation in clockwise direction whereas the other one is suitable for rotation in the opposite direction. Furthermore such an arrangement permits locating the end of the output shaft selectively on one or the other side of the transmission. Advantageously, it is provided that the unit transmission housing is also linearly symmetrical with regard to the journalling of the drive shaft. This yields the possibility of selectively causing the end of the input shaft to protrude from one or the other transmission side.

Referring now to the drawing in detail, the description will first refer to the type of assembly as indicated in full lines; with the other indicated types of assembly similar parts are designated with the same reference numerals but primed one or more times. Reference numerals on parts of an assembly type pertaining thereto have the same number of primes.

As will be evident from the drawing, the drive of the transmission is effected through the drive shaft 1 in the direction of rotation of the arrow 2a; 2b. The drive shaft is journalled in bearings 3 and 4 in the unit transmission 5 and carries the large gear 6 of the input stage of the fluid flow transmission 7. Extending through the central axis of the fluid flow transmission 7 and the drive shaft 1 and located in the central plane of the gear 6 there is an imaginary straight line 8. The unit transmission housing 5 has bearing areas 3' and 4' which with regard to line 8 are symmetrically arranged with regard to the bearing areas for bearings 3 and 4 respectively. The drive shaft may thus with one and the same unit transmission housing 5 also be mounted in the position 1' indicated in dash lines. In other words, without keeping available special parts, the transmission is adapted to be delivered selectively with input shaft studs on the left-hand side or on the right-hand side. The gear 6 is in mesh with the primary shaft pinion 9 of the fluid flow transmission 7. The fluid flow transmission in most instances comprises two differently designed converters I and II. These two converters have a common hollow primary shaft 10 and a common solid secondary shaft 11. The turbine wheel of the converter I is designated with the reference numeral 111 whereas the turbine wheel of the converter II is designated with the reference numeral 112.

The housing 12 common to the two converters and supporting the fluid flow transmission may at two different areas be provided with turned sections 15 and 16 which may have the same dimensions and are symmetrically arranged with regard to the straight line 8. Similarly, in the unit transmission housing 5, bores 13 and 14 of the same dimensions are arranged symmetrically with regard to the straight line 8. These bores fit with the turned-out areas 15 and 16 of the fluid flow transmission. The housing 12 of the transmission drive 7 can be built into the unit housing 5 with all of the converters I and II built therein in two different positions tilted about the straight line 8 by 180°. In this way it will be possible to drive the fluid flow transmission 7 from the input shaft 1 in the direction of the arrow 2a of FIG. 1 and in a direction counter to said driving direction in the direction 2b with the assembly position shown in FIG. 2 without the necessity of effecting any changes with regard to the blades of the converter.

The housing 12 of the fluid flow transmission has at its front and rear portions two bores 19 and 20 of the same dimensions which bores are arranged symmetrically with regard to the straight line 8. The central secondary shaft 11 has at the two bearing areas which are likewise symmetrically located with regard to the straight line 8 and of the same dimensions. Furthermore, the secondary shaft is equipped with fastening flanges 17 and 18 for the secondary wheels 111 and 112. These flanges are likewise of the same design or the same dimensions and are symmetrically arranged with regard to the straight line 8. The counter flanges 21, 22 of the secondary wheels 111, 12 are of identical design and correspond to the connecting flanges 17 and 18. Such an arrangement and selection of the dimensions makes it possible that also the secondary shaft can be assembled in the fluid flow transmission 7 in two different positions offset by 180° about the straight line 8. In this way the transmission can selectively be furnished with left-hand or right-hand output shaft stud without the necessity of keeping special parts in stock. The great number of eight different possibilities of arranging the input and output shafts in combination with the two different output driving directions according to the invention may with the illustrated figures perhaps not be plausible immediately with a symmetrical housing 5. As a rule, such transmissions are followed by mechanical speed reducing transmissions or by mechanical change gear transmissions. The housings of these transmissions together with the unit transmission housing form a large housing which is no longer symmetrical with regard to the straight line 8. In view of such an arrangement, for instance, the possibility of providing input and output shaft on the left-hand side, driving direction in clockwise direction, actually represents a variant with regard to the possibility of providing the input and output shaft on the right-hand side and the driving direction in clockwise direction.

It is, of course to be understood that the present invention is, by no means, limited to the particular constructions shown in the drawing but also comprises numerous other possibilities, the scope of the invention being defined by the appended claims.

What I claim is:
1. A hydrodynamic transmission, especially for rail vehicles, which includes: a drive shaft adapted to be connected to a prime mover, at least two fluid flow circuits arranged substantially coaxially with regard to each other and having primary wheels and secondary wheels, a primary shaft common to and interconnecting said primary wheels of said two fluid flow circuits and substantially parallel to said drive shaft, a secondary shaft common to said secondary wheels of said two fluid flow circuits and interconnecting said secondary wheels, gear means drivingly interconnecting said drive shaft and said primary shaft while partially located between said two fluid flow circuits, first housing means common to and encasing said two fluid flow circuits, second housing means housing said first housing means and having the latter mounted therein at areas spaced from each other in the axial direction of said primary shaft, said second housing means also housing said drive shaft and said gear means, said secondary wheels being arranged substantially symmetrically with regard to a straight line passing through the axis of said fluid flow circuits and the central plane of said gear means which central plane is substantially perpendicular to the axis of rotation of said gear means, bearing means arranged in said first housing means symmetrically with regard to said straight line for supporting said secondary shaft, the areas where said first housing means is mounted in said second housing means likewise being arranged symmetrically with regard to said straight line.

2. A hydrodynamic transmission according to claim 1, in which said two fluid flow circuits are of different design.

3. A hydrodynamic transmission according to claim 1, in which said second housing means includes drive shaft supporting means arranged symmetrically with regard to said straight line for selectively mounting the major portion of said drive shaft on one or the other side of said straight line.

4. A hydrodynamic transmission according to claim 1, in which said two fluid flow circuits are torque converters.

References Cited

UNITED STATES PATENTS

| 2,142,269 | 1/1939 | Gössler | 60—54 XR |
| 2,158,231 | 5/1939 | Gössler | 60—54 |
| 2,839,011 | 6/1958 | Kugel | 60—54 XR |
| 3,169,371 | 2/1965 | Kugel | 60—54 |

EDGAR W. GEOGHEGAN, Primary Examiner